Patented Dec. 12, 1944

2,364,762

UNITED STATES PATENT OFFICE 2,364,762

TREATMENT OF AROMATIC HYDROCARBONS

Louis Schmerling and Arthur M. Durinski, Chicago, Ill., assignors to Universal Oil Products Company, Chicago, Ill., a corporation of Delaware No Drawing. Application May 19, 1941, Serial No. 394,166

17 Claims. (Cl. 260—671)

This invention relates to the treatment of aromatic hydrocarbons to produce therefrom alkylated aromatic hydrocarbons. More specifically the process is concerned with the interaction of an aromatic hydrocarbon and an alkyl or aralkyl halide to produce mono-alkylated and poly-alkylated aromatic hydrocarbons.

It is recognized that benzene has been converted into alkylated benzenes by treatment with an alkyl chloride in the presence of aluminum chloride. This reaction has the disadvantage that complex addition compounds are formed apparently involving the aluminum chloride and thus producing sludge-like materials which decrease the life of the aluminum chloride and interfere with continuous operation of the process. The present invention differentiates from the prior art on this subject in that the aromatic hydrocarbon and alkyl halide, this term being herein used broadly to include both alkyl and aralkyl halides, are caused to interact in the presence of a reactor packing material as hereinafter described.

In one specific embodiment the present invention comprises a process for producing alkylated aromatic hydrocarbons which includes contacting an aromatic hydrocarbon with an alkyl halide in the presence of a metal oxide catalyst under alkylating conditions of temperature and pressure.

Aromatic hydrocarbons, such as benzene, toluene, other alkylated benzenes, naphthalene, alkylated naphthalenes, other polynuclear aromatics, etc., which are alkylated by alkyl halides as hereinafter set forth, may be obtained by the distillation of coal, by the dehydrogenation and cyclization of aliphatic hydrocarbons and of alkylated aromatic hydrocarbons, and by other means.

Alkylating agents suitable for use according to the process of the present invention comprise alkyl halides including particularly chlorides, bromides, and fluorides. Typical alkyl chlorides comprise the methyl, ethyl, propyl, and isopropyl compounds as well as various butyl, pentyl, and higher alkyl derivatives. Aralkyl halides, of which benzyl chloride is typical, are also utilizable as alkylating agents for aromatic hydrocarbons.

While the alkylation reaction occurs readily in the absence of added catalytic material, the velocity of this reaction is increased by the presence within the reactor of one or more of a number of metal oxides or metal oxide-containing catalysts of which the following are representative: Zinc oxide, ferric oxide, magnesium oxide, aluminum oxide, bauxite, silica gel, diatomaceous earth, clays, composites of silica-alumina, silica-alumina-zirconia, silica-alumina-thoria, etc. These different catalytic reactor packing materials may also be composited in many ways. Thus zinc oxide may be used as such or it may be supported on suitable carriers including diatomaceous earth, clays, various forms of alumina, silica-alumina composites, etc. The zinc oxide may be placed on the carrier by a series of steps which comprise impregnation of the carrier with an aqueous solution of zinc nitrate, calcination of the nitrate to the oxide or by treating the supported zinc nitrate with a water-soluble carbonate to precipitate zinc carbonate which is then calcined to the oxide. Also, zinc oxide and another material such as alumina may be mixed intimately as powders and then pelleted to form packing material suitable for use in the process.

Alkylation of aromatic hydrocarbons of the types hereinabove set forth are also carried out in the presence of hydrogen or of a hydrogen-containing gas. There is relatively little formation of carbon and heavy hydrocarbonaceous material upon the reactor packing material when these conversion reactions are carried out under hydrogen pressure, but carbon formation does occur to a substantial extent in the absence of added hydrogen.

In effecting reaction between benzene or another aromatic hydrocarbon and an alkyl halide according to the process of the present invention, the exact method of procedure varies with the nature of the reacting constituents as well as with the composition of the reactor packing material, the presence of which accelerates the alkylation reaction. A simple procedure which is used in alkylating benzene consists in contacting a mixture of benzene and an alkyl chloride, such as isopropyl chloride, with silica gel or another suitable reactor packing material at a temperature of from about 100° to about 500° C. and preferably from about 200° to about 400° C. under a pressure of from substantially atmospheric to approximately 200 atmospheres or more. Intimate contact of the reacting components is effected by passing the reaction mixture over a fixed bed of the metal oxide reactor packing material or the reacting components may be mixed in the presence of finely powdered silica or other material. The reaction mixture undergoing treatment preferably contains between about 1 and about 20 molecular proportions of aromatic hydrocarbon per 1 molecular proportion of alkyl halide in order to diminish production of polyalkylated hydrocarbons and to favor the production of the mono-alkylated aromatic compounds.

Thus benzene and ethyl chloride or isopropyl chloride are commingled and passed through a reactor containing a granular material such as a composite of zinc oxide and alumina, or at least a portion of the benzene is charged to a reactor while the alkyl halide as such or preferably diluted by another portion of the benzene being treated, is introduced at various points between the inlet and the outlet of the reaction zone in such a way that the mixture undergoing reaction will at all times contain a relatively low proportion of alkyl chloride and thus favor the production of mono-alkylated benzene rather than the formation of more-highly alkylated benzenes.

Hydrogen chloride formed during the alkylation of an aromatic hydrocarbon by an alkyl halide is recovered as a valuable by-product which may be utilized for any other purpose as desired or a portion of said hydrogen chloride may be commingled with the reactants charged to the process.

While the method of passing an alkyl halide and benzene or another aromatic hydrocarbon, either together or counter-currently, through a suitable reactor under suitable conditions of temperature and pressure in the presence of added granular packing material is the generally preferred procedure, the interaction of an alkyl halide and an aromatic hydrocarbon may also be effected in batch type operation utilizing a closed vessel in which some of the reacting constituents are in liquid phase and are maintained in intimate contact by some means of agitation. The choice of operating procedure is dependent upon such circumstances as the temperature and pressure found to be most effective for producing the desired reaction between a particular aromatic hydrocarbon and an alkyl chloride or other alkyl halide.

In general the products formed by interaction of an alkyl halide with a molal excess of an aromatic hydrocarbon are separated from the unreacted aromatic hydrocarbon by suitable means as by distillation and the unreacted portion of the aromatic hydrocarbon originally charged is returned to the process and commingled with additional quantities of the mixture of alkyl halide and aromatic hydrocarbon being charged to reaction. Thus the alkylated aromatic hydrocarbons may be substantially freed from the excess of the originally charged aromatic hydrocarbon and then be separated into desired fractions or individual compounds by distillation at ordinary or reduced pressure or by other suitable means.

The following examples are given to illustrate the character of results obtained by the use of the present process, although the data presented are not introduced with the intention of unduly limiting the generally broad scope of the invention.

EXAMPLE I

A mixture of 80 parts by weight of benzene, 39 parts by weight of isopropyl chloride, and 10 parts by weight of alumina in the form of 3 x 3 mm. pellets was placed in an autoclave, hydrogen was added to an initial pressure of 100 atmospheres, and the reaction mixture was then heated for 4 hours at 300° C. The resulting reaction product yielded 28 parts by weight of mono-isopropyl benzene and 16 parts by weight of poly-isopropyl benzene.

EXAMPLE II

A mixture of 80 parts by weight of benzene, 39 parts by weight of isopropyl chloride, and 5 parts by weight of zinc oxide was placed in a glass-lined autoclave to which hydrogen was added to give an initial pressure of 100 atmospheres. The resulting mixture after being heated for 4 hours at 300° C. yielded 28 parts by weight of iso-propyl benzene, 14 parts by weight of di-isopropyl benzene, and 2.9 parts by weight of higher boiling material.

EXAMPLE III

A mixture of 80 parts by weight of benzene, 39 parts by weight of isopropyl chloride, 3 parts by weight of zinc oxide, and 7 parts by weight of alumina was placed in the autoclave used in Example I, and hydrogen was added to 100 atmospheres initial pressure. The autoclave so charged was then heated for 4 hours at 300° C. and a total of 91 parts by weight of liquid hydrocarbons was recovered which contained 33 parts by weight of mono-isopropyl benzene, 6.4 parts by weight of di-isopropyl benzene, and 3.6 parts by weight of more-highly alkylated benzene.

EXAMPLE IV

A mixture of 80 parts by weight of benzene, 40 parts by weight of isopropyl chloride, and 10 parts by weight of 3-8 mesh silica gel was placed in an autoclave, hydrogen was added thereto to a total pressure of 100 atmospheres, and the resulting mixture was heated for 4 hours at the temperatures indicated and with the results shown in the following table:

TABLE

*Alkylation of benzene with isopropyl chloride in the presence of silica gel*

| Run No. | Temp., °C. | Maximum pressure, atmos. | Isopropyl benzenes, parts by wt. | | |
|---|---|---|---|---|---|
| | | | Mono- | Di- | Higher |
| 1 | 150 | 152 | 21 | 19 | 6 |
| 2 | 200 | 168 | 19 | 17 | 8 |
| 3 | 200 | 190 | 21 | 19 | 5 |
| 4¹ | 200 | 165 | 7 | | 3 |
| 5² | 200 | 23 | 11 | | 5 |
| 6 | 250 | 195 | 16 | 12 | 7 |
| 7¹ | 250 | 198 | 19 | 8 | 4 |
| 8 | 300 | 220 | 22 | 12 | 4 |
| 9 | 350 | 200 | 23 | 16 | 3 |

¹ Glass-lined autoclave—autoclave liner of glass equipped with glass stopper containing capillary designed to minimize contact of reaction mixture with the steel walls of the autoclave.
² No hydrogen added.

In the absence of added silica gel otherwise identical reaction mixtures treated at 150° C. yielded 4 parts by weight of mono-isopropyl benzene and 2 parts by weight of higher boiling material, while at 250° C., like reaction mixtures of benzene and isopropyl chloride yielded 10 parts by weight of mono-isopropyl benzene, 8 parts by weight of di-isopropyl benzene, and 6 parts by weight of higher boiling material.

The above results show that silica gel catalyzed the condensation of benzene with isopropyl chloride at temperatures as low as 150° and 200° C. Better yields were obtained when no capillary stopper was used on the glass liner of the autoclave, these results indicating that even in the presence of silica gel better results were obtained if the reactants could also come in contact with the steel walls of the autoclave. In run #5 alkylation occurred also at 200° C. under a rela tively low pressure in the absence of added hydrogen but in the presence of silica gel.

EXAMPLE V

A mixture of 80 parts by weight of benzene, 40 parts by weight of isopropyl chloride, and 10 parts by weight of ferric oxide was placed in a glass-lined autoclave, hydrogen was added to 100 atmospheres pressure, and the resulting mixture was heated for 4 hours at 200° C. under a maximum pressure of 178 atmospheres. From the reaction product was obtained 22 parts by weight of mono-isopropyl benzene, 9 parts by weight of di-isopropyl benzene, and 9 parts by weight of higher boiling materials.

EXAMPLE VI 80 parts by weight of benzene, 25 parts by weight of methyl chloride, and 10 parts by weight of a synthetically prepared silica-alumina-zirconia catalyst were placed in a rotating autoclave under an initial nitrogen pressure of 30 atmospheres and then heated for 4 hours at 300° C. under a maximum pressure of 110 atmospheres. The catalyst used was a synthetically prepared material formed by compositing 100 molecular proportions of hydrated silica, 2 molecular proportions of hydrated alumina, and 5 molecular proportions of hydrated zirconia, washing the composite until substantially free from alkali metal compounds, drying the resulting precipitated material and then grinding said material, mixing it with 4% by weight of flour and 2% by weight of stearic acid to form a composite suitable for forming into pellets by a pelleting machine. The formed pellets were then calcined in air to remove the flour and stearic acid.

At the end of the reaction the autoclave was cooled and 85 parts by weight of yellow liquid and 12 parts by weight of black catalyst pellets were removed therefrom. The liquid product was found to contain 6 parts by weight of toluene, and 4.5 parts by weight of xylenes and more-highly methylated benzene. The toluene was identified by preparation of 2,4-di-nitrotoluene with a melting point of 70° C.

EXAMPLE VII 80 parts by weight of benzene, 70 parts by weight of isobutyl bromide, and 10 parts by weight of 3 x 3 mm. alumina pellets were charged to a steel autoclave which was then placed under 30 atmospheres initial nitrogen pressure, rotated, and heated for 4 hours at 250° C. The 106 parts by weight of liquid reaction products contained 26 parts by weight of mono-butyl benzenes boiling between 168° and 175° C. and 16 parts by weight of higher boiling material. Preparation of the di-acetamino derivative of the mono-butyl benzene fraction indicated that this fraction consisted of a mixture of isobutyl benzene and tertiary butyl benzene.

The nature of the present invention and its commercial utility can be seen from the specification and examples given, although neither section is intended to limit its generally broad scope.

We claim as our invention:

1. A process for producing alkylated aromatics which comprises subjecting an alkylating agent, consisting essentially of an alkyl halide, and a molecular excess of an aromatic hydrocarbon to reaction under alkylating conditions and in the presence of a solid alkylating catalyst consisting essentially of at least one metal oxide.

2. A process for producing alkylated aromatics which comprises subjecting an alkylating agent, consisting essentially of an alkyl halide, and a molecular excess of an aromatic hydrocarbon to reaction at an alkylating temperature of from about 100° C. to about 500° C. and in the presence of a solid alkylating catalyst consisting essentially of at least one metal oxide.

3. A process for producing an alkylated benzene which comprises contacting from about 1 to about 20 molecular proportions of benzene with 1 molecular proportion of an alkylating agent consisting essentially of an alkyl halide at a temperature of from about 100° to about 500° C. under a pressure of from substantially atmospheric to approximately 200 atmospheres in the presence of an alkylating catalyst consisting essentially of at least one metal oxide.

4. A process for producing alkylated aromatics which comprises subjecting a mono-halo-alkane and a molecular excess of an aromatic hydrocarbon to reaction under alkylating conditions and in the presence of a solid alkylating catalyst consisting essentially of at least one metal oxide comprising zinc oxide.

5. A process for producing alkylated aromatics which comprises subjecting a mono-halo-alkane and a molecular excess of an aromatic hydrocarbon to reaction at an alkylating temperature of from about 100° C. to about 500° C. and in the presence of a solid alkylating catalyst consisting essentially of at least one metal oxide comprising zinc oxide.

6. A process for producing a substantial yield of mono-alkylated benzene which comprises contacting from about 1 to about 20 molecular proportions of benzene with 1 molecular proportion of an alkylating agent consisting essentially of an alkyl bromide at a temperature of from about 100° to about 500° C. under a pressure of from substantially atmospheric to approximately 200 atmospheres in the presence of hydrogen and of an alkylating catalyst consisting essentially of at least one metal oxide capable under said conditions of molecular proportions of said reactants, temperature and pressure of catalytically promoting condensation reactions between said benzene and said alkyl bromide for production of mono-alkylated benzene.

7. A process for producing a substantial yield of mono-alkylated benzene which comprises contacting from about 1 to about 20 molecular proportions of benzene with 1 molecular proportion of an alkylating agent consisting essentially of an alkyl bromide at a temperature of from about 100° to about 500° C. under a pressure of from substantially atmospheric to approximately 200 atmospheres in the presence of an alkylating catalyst consisting essentially of at least one metal oxide capable under said conditions of molecular proportions of said reactants, temperature and pressure of catalytically promoting condensation reactions between said benzene and said alkyl bromide for production of mono-alkylated benzene.

8. A process for producing a substantial yield of mono-alkylated benzene which comprises contacting from about 1 to about 20 molecular proportions of benzene with 1 molecular proportion of an alkylating agent consisting essentially of an alkyl halide at a temperature of from about 100° to about 500° C. under a pressure of from substantially atmospheric to approximately 200 atmospheres in the presence of hydrogen and of an alkylating catalyst consisting essentially of at least one metal oxide.

9. A process for producing ethyl benzene which comprises contacting from about 1 to about 20 molecular proportions of benzene with 1 molecular proportion of an alkylating agent consisting essentially of an ethyl halide at a temperature of from about 100° to about 500° C. under a pressure of from substantially atmospheric to approximately 200 atmospheres in the presence of hydrogen and of an alkylating catalyst consisting essentially of at least one metal oxide capable under said conditions of molecular proportions of said reactants, temperature and pressure of catalytically promoting condensation reactions between said benzene and said ethyl halide for production of ethyl benzene.

10. A process for producing a butyl benzene which comprises contacting from about 1 to about 20 molecular proportions of benzene with 1 molecular proportion of an alkylating agent consisting essentially of a butyl halide at a temperature of from about 100° to about 500° C. under a pressure of from substantially atmospheric to approximately 200 atmospheres in the presence of hydrogen and of an alkylating catalyst consisting essentially of at least one metal oxide capable under said conditions of molecular proportions of said reactants, temperature and pressure, of catalytically promoting condensation reactions between said benzene and said butyl halide for production of a butyl benzene.

11. A process for producing isopropyl benzene which comprises contacting from about 1 to about 20 molecular proportions of benzene with 1 molecular proportion of an alkylating agent consisting essentially of an isopropyl halide at a temperature of from about 100° to about 500° C. under a pressure of from substantially atmospheric to approximately 200 atmospheres in the presence of hydrogen and of an alkylating catalyst consisting essentially of at least one metal oxide.

12. The process as defined in claim 2 further characterized in that said aromatic hydrocarbon is benzene.

13. The process as defined in claim 5 further characterized in that said catalyst contains aluminum oxide in addition to the zinc oxide.

14. The process as defined in claim 2 further characterized in that said catalyst contains aluminum oxide.

15. The process as defined in claim 4 further characterized in that said catalyst contains aluminum oxide in addition to the zinc oxide.

16. The process as defined in claim 1 further characterized in that said catalyst contains aluminum oxide.

17. The process as defined in claim 2 further characterized in that said alkyl halide is a monochloro-alkane.

LOUIS SCHMERLING.
ARTHUR M. DURINSKI.